United States Patent [19]

Breiter

[11] 3,959,013

[45] May 25, 1976

[54] CATHODE CELL CASING PORTION, A CELL CASING, AND A HERMETICALLY SEALED SODIUM-SULFUR CELL

[75] Inventor: Manfred W. Breiter, Schenectady, N.Y.

[73] Assignee: General Electric Company, Schenectady, N.Y.

[22] Filed: June 11, 1975

[21] Appl. No.: 586,048

[52] U.S. Cl. .............................. 136/6 FS; 136/20; 136/83 R; 136/83 T
[51] Int. Cl.[2] ........................................ H01M 10/00
[58] Field of Search ........... 136/6 F, 6 FS, 20, 83 R, 136/83 T, 131, 167, 166

[56] References Cited
UNITED STATES PATENTS

| | | | |
|---|---|---|---|
| 3,749,603 | 7/1973 | Stringham et al. .................. | 136/6 F |
| 3,758,337 | 9/1973 | Fally et al. ..................... | 136/83 R X |
| 3,826,685 | 7/1974 | Dubin et al. ..................... | 136/83 R |
| 3,841,912 | 10/1974 | Kagawa et al. ................... | 136/20 X |
| 3,868,273 | 2/1975 | Will et al. ......................... | 136/20 X |
| 3,881,955 | 5/1975 | Dubin et al. ..................... | 136/83 R |

*Primary Examiner*—John H. Mack
*Assistant Examiner*—C. F. Lefevour
*Attorney, Agent, or Firm*—Paul R. Webb, II; Joseph T. Cohen; Jerome C. Squillaro

[57] ABSTRACT

A cathode cell casing portion, a cell casing, and a hermetically sealed sodium-sulfur cell are disclosed. The metallic cathode cell casing portion is made of one of several specific metals with a corrosion resistant and electronically conducting layer adhering to the inner surface of the casing. The cell casing includes the above cathode cell casing portion and an opposed anode cell casing portion joined to a ceramic ring supporting an inner casing of a solid sodium ion-conductive material. A hermetically sealed sodium-sulfur cell has the above type of casing with a sodium negative electrode in the inner casing and a positive electrode of sulfur in conductive material in the cathode casing portion surrounding the inner casing.

4 Claims, 2 Drawing Figures

U.S. Patent  May 25, 1976  3,959,013
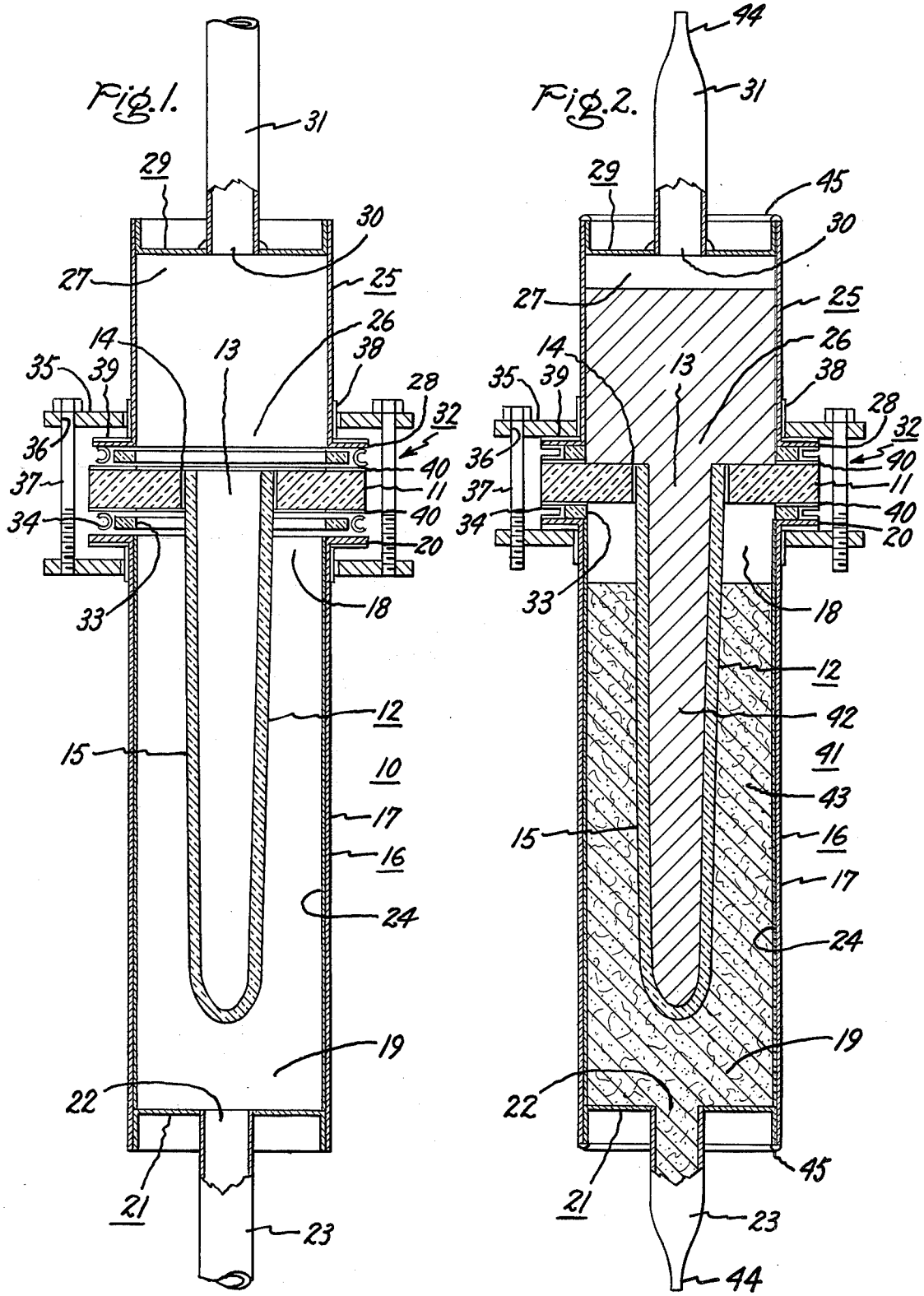

CATHODE CELL CASING PORTION, A CELL CASING, AND A HERMETICALLY SEALED SODIUM-SULFUR CELL

This invention relates to improved cell casing portions, cell casings, and hermetically sealed cells and, more particularly, to such cell casing portions, cell casings, and sealed cells for employment in hermetically sealed sodium-sulfur cells.

Sodium-sulfur cells, which operate at elevated temperatures, are known in the prior art as, for example, described in Kummer et al U.S. Pat. No. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium-sulfur battery can be sodium beta-alumina.

Sodium-sulfur batteries are shown also, for example, in Kummer et al U.S. Pat. No. 3,404,036 and in Kummer et al U.S. Pat. No. 3,413,150.

In above Kummer et al U.S. Pat. No. 3,404,036, there is shown in FIG. 2, and there is described in column 8, lines 24–32, and in column 9, lines 1–19, a thermo-electric generator wherein sodium is contained in an inner tube and a vacuum is created in an outer metal tube. The outer metal tube has a flange at its open end which flange is provided with a groove or channel in which rests a rubber O-ring for a vacuum tight seal. A metal cover plate is secured to the outer tube by thread, bolt or other conventional attaching means not shown. The outer metal tube does not contain sulfur or a sulfur component. FIG. 1 of this patent shows and column 4, lines 19–39 describes a sodium-sulfur battery wherein glass tubes 11 are sealed by glass to the sodium beta-alumina.

My present invention is directed to providing an improved cell casing portion, a cell casing, and an improved hermetically sealed sodium-sulfur cell over the above-identified patents in that a metallic cathode portion made of a specific metal with a corrosion resistant and electronically conducting layer adhering to its inner surface is employed.

The primary objects of my invention are to provide an improved cell casing portion, a cell casing, and a hermetically sealed sodium-sulfur cell with long life and resistance to corrosion.

In accordance with one aspect of my invention, a cathode cell casing portion includes a container of a specific metal with a corrosion resistant layer adhering to its inner surface.

These and various other objects, features and advantages of the invention will be better understood from the following description taken in connection with the accompanying drawing in which:

FIG. 1 is a sectional view of a cell casing including a cathode cell casing portion made in accordance with my invention; and FIG. 2 is a sectional view of a hermetically sealed sodium-sulfur cell made in accordance with my invention.

In FIG. 1 of the drawing, there is shown generally at 10 a cell casing embodying my invention which has a ceramic ring 11, an inner casing of a solid sodium ion-conductive material 12 with one open end 13, and a glass seal 14 sealing a portion of the outer wall 15 of inner casing 12 adjacent its open end 13 within and to the ceramic ring 11. A metallic aluminum cathode casing portion 16 embodying my invention has a tubular container 17 with opposite open ends 18 and 19 and a flange 20 at open end 18 surrounds inner casing 12 and is spaced therefrom. A removable closed end 21 for opposite open end 19 of anode tubular container 17 has a fill opening 22 in removable closed end 21, and a fill tube 23 affixed to removable closed end 21 and in communication with the fill opening 22. A corrosion resistant layer 24 of molybdenum adheres to the inner surface of tubular container 17.

A metallic anode casing portion 25 of aluminum has opposite open ends 26 and 27 and a flange 28 at open end 24. Metallic anode casing portion 25 extends in an opposite direction to metallic cathode casing portion 16. A second removable closed end 29 for opposite open end 27 of second outer casing portion 25 has a fill opening 30 in second removable closed end 29, and a fill tube 31 affixed to second removable closed end 29 and in communication with fill opening 30.

Means for joining cathode and anode metallic casing portions 16 and 25 to ceramic ring 11 is shown provided by a hermetic mechanical seal shown generally at 32 thereby forming a continuous outer cell casing. This seal is described and claimed in copending U.S. pat. application Ser. No. 550,464 filed Feb. 18, 1975 in the names of Manfred W. Breiter, Stephan P. Mitoff and Robert W. Powers and entitled "Cell Casing With a Hermetic Mechanical Seal and a Hermetically Sealed Sodium-Sulfur Cell." This copending application is assigned to the same assignee as the present application. Seal 32 comprises a pair of retainer rings 33, each of which is positioned between ceramic ring 11 and an adjacent flange 20 or 28 of outer casing portions 16 and 25, respectively. A pair of open C shaped sealing rings 34 are positioned similarly to rings 33 but surround exteriorly and are spaced from rings 33. The open portion of each C shaped sealing ring faces outwardly. A retaining collar 35 is positioned around each outer metallic casing portion and adjacent to the opposite surface of the casing flange. Each collar 35 has at least a pair of and preferably a plurality of apertures 36 therethrough. The collars are positioned so that the respective apertures 36 are aligned. Threaded fasteners 37, each passing through a pair of associated apertures, are employed to tighten the mechanical seal to produce a hermetic mechanical seal 32. Electrical insulation 38 in the form of fiberglass tape is shown wound around the exterior surface of outer casing portions 16 and 25 adjacent the respective flanges 20 and 26 to prevent shortcircuiting of the cell by seal 28. Electrical insulation 39 in the form of an inorganic fiber cloth ring is positioned between each flange 20 and 28 and the surface of each associated collar 35 to prevent shortcircuiting of the cell by seal 32. While the opposite surfaces of ceramic ring 11 are smooth to insure a good seal, there is shown also a preferred ring 40 of aluminum foil between the opposite surface of retainer ring 33 and sealing ring 34, and the associated surface of ceramic ring 11 to provide a smoother surface. In FIG. 1, seal 32 is shown in position but fasteners 37 have not been tightened to show more clearly the details of the hermetic mechanical seal.

I found that I could form such a cathode cell casing portion by providing a metallic tubular container with opposite open ends and a flange at one open end. A removable metallic closed end is provided for the other open end. The removable end has a fill opening therein, and a fill tube affixed thereto and in communication with the fill opening. I found that the cathode cell casing portion including the tubular container and the removable end can be formed of a metal selected from the class consisting of aluminum, steel, and iron-nickel-cobalt alloys. I found that a corrosion resistant and electronically conducting layer must be applied and adhere to the inner surface. The corrosion resistant and electronically conducting layer is formed of a material selected from the class consisting of molybdenum and graphite.

The above metals for the cathode cell casing portion are desirable cathode container materials. However, during operation of a sodium-sulfur cell, the polysulfide melts in the cathode casing portion corrode the metal container material by forming films on the inner surface thereof. These films increase the contact resistance between the inner walls of the cell and the conductive material of the positive electrode thereby resulting in an increase of the internal resistance of the cell.

I found that the above corrosion and corresponding film formation can be eliminated by providing a corrosion resistant layer adhering to the inner surface of the cell casing portion. I found further that molybdenum and graphite provided such a corrosion resistant layer. One suitable method of applying and adhering the molybdenum layer to the inner surface of the cell casing portion is to plasma spray such surfaces with a thin layer of molybdenum. One suitable method of applying a similar layer of graphite is to provide a mixture of graphite and a binder, such as Aquadag, which is manufactured by Joseph Dixon Crucible Co., Jersey City, N.J. and which is a suspension of graphite in water, and to paint the binder on the inner surface of the cell casing portion. The cathode cell casing portion is then heated to 400°C and maintained at this temperature for two hours resulting in the removal of the binder and the formation of a thin graphite coating.

I found that I could form a cell casing employing the above-described cathode cell casing portion by providing a ceramic ring with opposite smooth surfaces, for example, of alpha-alumina. An inner casing of a solid sodium ion-conductive material of sodium beta-alumina with one open end has a portion of its outer wall adjacent its open end sealed within and to the ceramic ring with a glass seal.

A cathode cell casing portion of the above type with opposite open ends and a flange at one open end adjacent the ceramic ring is positioned around the inner casing and is spaced therefrom. A removable metallic or non-metallic closed end is provided for the opposite open end of the cathode cell casing portion. This closed end has a fill opening therein and a fill tube affixed thereto and is in communication with the fill opening. An anode cell casing portion made of the same metal as the cathode cell casing portion with opposite open ends and a flange at one open end is positioned with the flange adjacent the ceramic ring whereby the anode cell casing portion is spaced from and extends in an opposite direction to the cathode cell casing. A metallic removable closed end is provided for the opposite open end of the cathode cell casing portion. This closed end has a fill opening therein and a fill tube affixed thereto and is in communication with the fill opening. Such a cell casing can be formed as described above but that either or both cell casing portions can be provided with a closed end rather than a removable closed end.

The cell casing portion can be joined to the ceramic ring by a hermetic mechanical seal thereby forming a continuous outer battery casing. The seal comprises a pair of retainer rings, each of which is positioned between the ceramic ring and an adjacent flange of the outer casing portion. A pair of open C shaped sealing rings are positioned similarly to the retainer rings but surround exteriorly and are spaced from the retainer rings. The open portion of each C shaped sealing ring faces outwardly. A retaining collar is positioned around each outer metallic casing portion and adjacent to the opposite surface of the casing flange. Each collar has at least a pair of and preferably a plurality of apertures therethrough. The collars are positioned so that the respective apertures are aligned. Threaded fasteners, each passing through a pair of associated apertures, are employed to tighten the mechanical seal to produce a hermetic mechanical seal. Electrical insulation is provided around the exterior surface of the outer casing portions adjacent the associated flanges and between each flange and the associated collars to prevent short-circuiting of the cell by the seal. While fiberglass tape is described around the exterior surface of the casing and inorganic fiber cloth between each flange and its associated collar, it will be appreciated that a variety of electrical insulation materials can be employed. While a smooth faced ceramic ring insured a good seal, it is preferable to employ a ring of material such as aluminum foil to produce an even smoother surface. In FIG. 1, the seal is shown in position but the fasteners have not been tightened to show more clearly the details of the hermetic mechanical seal.

Retainer rings of stainless steel or aluminum are preferred but other metallic and non-metallic materials can be employed. The sealing rings are resilient metallic open edge rings in configuration such as a C shaped ring or a W shaped ring. An open edge metallic C shaped ring made of Inconel alloy is preferred but other metals can be employed. Such open edge metallic sealing rings are commercially available, for example, from Pressure Science Inc., 11,842 Old Baltimore Pike, Beltsville, Md. The open edge of the sealing ring can face in either direction but it is preferred to have the open edge facing toward the exterior of the cell. This particular sealing ring is provided because of its corrosion resistance when employed in a cell. When the threaded fasteners are tightened and a pressure from about 300 lbs. and above is applied by the retaining collars and threaded fasteners, a hermetical seal which is helium-leak-tight on thermal cycling is produced for the casing.

It is understood that other types of seals can be employed, for example, glass seals which seal each cell casing portion flange and the associated surface of the ceramic ring as described and claimed in copending U.S. pat. application Ser. No. 447,850 filed Mar. 4, 1974 in the names of Stephan P. Mitoff, Robert W. Powers and Manfred W. Breiter and entitled "Battery Casing and Hermetically Sealed Sodium-Sulfur Battery". The copending application is assigned to the same assignee as the present application.

As described in the above copending application, for each of the seals, glass is provided initially in the form of a washer. Each washer is positioned between adjacent associated parts to be sealed. The glass washers are made of a suitable sodium and sulfur resistant glass such as Corning glass No. 7052, General Electric Company glass No. 1013, Sovirel glass No. 747 or Kimble glass No. N-51A. The associated components with the glass washer therebetween are heated to a temperature in the range of 950° to 1250°C in an argon atmosphere whereby the glass seals together the associated component. The upper portion of the outer wall of the inner casing is sealed in this manner within and to the interior surface of the ceramic ring. Each outer casing is sealed separately to the ceramic ring in the same manner. The end of each outer casing can be provided with an outwardly or inwardly extending flange for such sealing to the ceramic ring. Further, the end of each outer casing can be sealed to the perimeter of the ceramic ring.

We found further that either or both of the outer casing portions can be provided with an open end and a flange at the open end with the other end closed. Further, either or both of the outer casing portions can be both opposite open ends and a flange at one open end. A removable closed end is then provided for the opposite open end of each of the outer casing portions.

In FIG. 2 of the drawing, there is shown a hermetically sealed sodium-sulfer cell 41 employing cell casing 10 of FIG. 1. The hermetic mechanical seal is shown in its tightened or hermetic position. A negative electrode 42 of sodium metal is positioned preferably within inner casing 12 and partially within aluminum casing anode portion 25. A positive electrode 43 of sulfur in an electrically conductive material is positioned preferably within aluminum cathode casing 16 and is in contact with outer wall 15 of inner vessel 12 and with corrosion resistant layer 24 adhering to the interior surface of container 17. A void volume is provided between ceramic ring 11 and the upper portion of positive electrode 43 to provide space for reactant during operation of the cell. Fill tubes 23 and 31 are shown closed in any suitable manner such as by respective welds 44. Closed ends 21 and 29 are affixed to outer casing portions 16 and 25, respectively, as by welding at 45. The resulting structure is a hermetically sealed sodium-sulfur cell.

In one embodiment, I found that I could form a hermetically sealed sodium-sulfur cell by employing the above-described cell casing. The hermetic mechanical seal is shown in its tightened or hermetic position. The negative electrode, which consists of sodium metal is positioned preferably within the inner casing and its associated anode casing portion. The positive electrode is positioned preferably within the cathode casing portion surrounding the inner casing and is in contact with the exterior surface of the inner casing and with the interior of the cathode casing portion except for a void volume at the upper end adjacent the ceramic ring. The inner casing and a portion of the associated anode casing portion are filled with sodium metal by filling the inner casing and by filling partially the associated anode casing portion through the fill tube and fill opening with molten sodium. The fill tube is then closed, for example, by crimping or by welding. In this manner there is a hermetically sealed negative electrode reactant compartment for the cell. The positive electrode, which consists of sulfur in a conductive material, is then positioned within the other outer casing portion of the cell. This is accomplished, for example, by positioning an electrically conductive material such as carbon felt within this outer casing portion. This outer casing portion is filled with carbon or graphite felt, hereinafter referred to as graphite felt, so that it contacts the exterior surface of the inner casing, the inner surface of the cathode casing portion, extends to the initially open end of the surrounding cathode casing portion, and provides a void volume adjacent the ceramic ring. The closed end is then welded to the outer casing portion. Molten sulfur is then filled into this cathode casing portion through the associated fill tube and fill opening, and allowed to solidify within the graphite felt thereby providing the positive electrode. The fill tube is then closed, for example, by crimping or by welding. The filling tubes enable the evacuation of the cell compartments at temperatures up to 600°C with subsequent introductions of sodium and sulfur, respectively, into the evacuated compartments without contact with the atmosphere. The resulting structure is a hermetically sealed sodium-sulfur cell.

In another embodiment we found that we could form a hermetically sealed sodium-sulfur cell by embodying the above-described casing. The hermetic mechanical seal is in its tightened or hermetic position. The negative electrode which consists of sodium metal is positioned preferably within the inner casing and its associated anode casing and its associated anode casing portion. The positive electrode is positioned preferably within the cathode casing portion and surrounds the inner casing and is in contact with the exterior surface of the inner casing and with the interior of the cathode casing portion except for a void volume at the upper end adjacent the ceramic ring. In this embodiment the anode casing portion has an open end and a flange at the open end and the opposite end is closed. The inner casing and a portion of the associated outer casing are filled with sodium metal in accordance with the method set forth in U.S. Pat. No. 3,740,206 issued June 19, 1973 and entitled "Method for Making Sealed Container for Elemental Sodium and Method of Forming." This patent is assigned to the same assignee as the present application. This patent and its subject matter is hereby incorporated by reference into the present application. Initially, the anode casing with its closed end is joined to the ceramic ring by the above-described hermetic mechanical seal. The cathode casing portion and associated retaining ring and open edge sealing ring are not used. Since the anode casing portion is closed ended at the end opposite its flanges, it is necessary to provide an electronic conductor in the form of a wire lead which extends through the second outer casing into the inner casing and in contact with the closed end of the inner casing. As set forth in the above-identified patent, the inner casing is immersed at least partially in a bath provided with sodium ions, the electronic conductor is connected to the negative terminal of a DC power source and a suitable electrode in the bath is connected to the positive terminal of the same source. A D.C. potential is applied across the inner casing thereby filling the casing with pure elemental sodium. The inner casing is removed from the bath and the hermetic seal is removed. The cathode casing portion, associated retaining ring and associated open end sealing ring are then tightened. The cathode casing has a removable end portion with an associated fill tube. The positive electrode, which consists of sulfur in a conductive material, is then positioned within the outer casing portion of the cell. This is accomplished, for example, as above-described by positioning an electrically conductive material such as graphite felt within this outer casing portion. This outer casing portion is filled with graphite felt so that it contacts the exterior surface of the inner casing, the inner surface of the cathode casing portion, extends to the initially open end of the surrounding cathode casing portion and provides a void volume adjacent the ceramic ring. The closed end is then welded to the outer casing portion. Molten sulfur is then filled into this outer casing portion through the associated fill tube and fill opening, and allowed to solidify within the graphite felt thereby providing the positive electrode. The fill tube is then closed, for example, by crimping or by welding. The resulting structure is a hermetically sealed sodium-sulfur cell.

Additionally, a closed end cathode outer casing portion can be used in our invention. The cell is provided with a sulfur in an electrically conductive material positive electrode within the first outer casing by employing the sulfur in a graphite felt sheet which is wound around the exterior of the inner casing prior to attaching and sealing the first outer casing portion to the cell as described previously. This is accomplished, for example, in accordance with U.S. Pat. No. 3,770,502 issued Nov. 6, 1973 and entitled "Sodium-Sulfur Storage Battery." This patent and its subject matter is hereby incorporated by reference. Such a positive electrode of sulfur in an electrically conductive material such as graphite felt can be preformed, and positioned within the first outer casing portion which is then attached and sealed to the cell as described previously. However, our positive electrode of sulfur in an electrically conductive material is in contact with the exterior surface of the inner casing and with the interior surface of the first outer casing portion.

For operation of this cell, an appropriate heating device (not shown) surrounds the cell to provide a necessary operating temperature of between 285°C and 400°C. Such a heating device can take various conventional forms such as a heating coil or a furnace. In the operation of the present sodium-sulfur cell within its elevated operating temperature during its discharge half cycle sodium ions are passed into the sulfur reactant within the cathode compartment of the cell on the opposite side of the solid sodium ion-conductive material tube. When the sodium atoms are ionized, they release electrons which are carried from the negative electrode compartment by an electric lead (not shown) to the positive electrode. In this manner electric energy is generated. While a single cell casing and a single hermetically sealed sodium-sulfur cell are described above, it will, of course, be appreciated that a multitube cell or a plurality of these single cells can be used to provide a useful multicell battery.

Examples of cathode cell casing portions, cell casings and hermetically sealed sodium-sulfur cells made in accordance with my invention are set forth below.

EXAMPLE I

A cathode cell casing portion was formed by providing a tubular aluminum container with opposite open ends and a flange at one open end, and a removable aluminum closed end for the opposite open end of the container. The removable end had a fill opening therein, and a fill tube affixed thereto and in communication with the fill opening. A thin layer of molybdenum was plasma sprayed onto the inner surface of the container. The resulting device was a cathode cell casing portion made in accordance with my invention.

EXAMPLE II

A cell casing was assembled generally as above-described and as shown in FIG. 1 by providing an alpha-aluminum ceramic ring, and an inner casing of a solid sodium ion-conductive material of sodium beta-aluminum with one open end which has a portion of its outer wall adjacent its open end sealed within and to the ceramic ring with General Electric Company glass No. 1013. The aluminum cathode casing portion of Example I with a closed end and an open end and a flange at the open end was provided for subsequently surrounding the inner casing and being spaced therefrom. The cathode casing portion included a removable aluminum closed end for the opposite open end of the first outer casing portion. This closed end had a fill opening therein and a fill tube affixed thereto and was in communication with the fill opening.

An aluminum anode casing portion was provided with opposite open ends and a flange at one open end. The anode casing portion extended in an opposite direction to the cathode casing portion. The anode casing portion included a removable aluminum closed end for the opposite open end of the anode casing portion. This closed end had a fill opening therein and a fill tube affixed thereto and was in communication with its associated fill opening.

The anode and cathode casing portions were joined to the ceramic ring by a hermetic mechanical seal thereby forming a continuous outer cell casing. The seal comprised a pair of metal retainer rings, each of which was positioned between the ceramic ring and an adjacent flange of the associated outer casing portion. A pair of open Inconel alloy C shaped sealing rings were positioned similarly to the retainer rings but surrounded exteriorly and were spaced from the retainer rings. The open portion of each C shaped sealing ring faced outwardly. A retaining collar was positioned around each outer metallic casing portion and adjacent to the opposite surface of the casing flange. Each collar had at least a plurality of apertures therethrough. The collars were positioned so that the respective apertures were aligned. The collars were insulated electrically from each outer casing portion. Threaded fasteners, each passing through a pair of associated apertures, were employed to tighten the mechanical seal to about 300 lbs. of pressure to produce a hermetic mechanical seal. During tightening the mechanical seal, the open C shaped rings were partially closed. The resulting structure was a cell casing made in accordance with our invention.

EXAMPLE III

A hermetically sealed sodium-sulfur cell was assembled by providing an alpha-alumina ceramic ring, and an inner casing of a solid sodium ion-conductive material of sodium-beta-alumina with one open end which has a portion of its outer wall adjacent its open end sealed within and to the ceramic ring with General Electric Company glass No. 1013. The aluminum cathode casing portion of Example I with a closed end and an open end and a flange at the open end was provided for subsequently surrounding the inner casing and being spaced therefrom.

An aluminum anode casing portion was provided with a closed end and an open end and a flange at the open end. The anode casing portion extended in an opposite direction to the subsequently joined cathode metallic casing portion. The anode casing portion was provided with an electronic conductor in the form of a nickel lead which extended through the second outer casing portion and through the outer open end thereof.

The anode casing portion had the flange at its open end positioned adjacent the ceramic ring whereby the electronic conductor extended into and was in contact with the interior surface of the closed end of the inner casing. Initially, only the anode casing was joined to the ceramic ring by the previously above-described hermetic mechanical seal in Example I. Thus, this seal comprised a retainer ring and an open edge C shaped sealing ring between the outer edge of the casing flange and the ceramic ring. A retaining collar was positioned on the opposite side of the flange and insulated electrically from the flange and the associated portion of the second outer casing portion. A similar retaining collar was positioned on the opposite side of the ceramic ring and threaded fasteners were inserted through aligned openings in the respective collars. The threaded fasteners were then tightened to about 300 lbs. of pressure to provide a hermetic seal between the second outer casing portion and the ceramic ring. The inner casing and a portion of the second outer casing was then filled with sodium in accordance with the above mentioned U.S. Pat. No. 3,740,206 by immersing the inner casing in a bath containing sodium ions after which the external portion of the electronic conductor was connected to the negative terminal of the D.C. source and the bath was connected to the positive terminal of the same source. A D.C. potential was then applied across the inner casing thereby filling the casing and filling partially the second outer casing portion. The inner casing was then removed from the bath and the sodium allowed to solidify. The threaded fasteners were untightened and the lower retaining collar was removed. Since the sodium had solidified prior to the removal of the threaded fasteners, the upper casing was sealed to the ceramic ring by means of the solidified sodium whereby the one portion of the hermetic seal was not destroyed.

A positive electrode of sulfur in graphite felt in a preformed shape with a central opening therethrough was positioned within the cathode casing portion. The cathode casing was joined to the ceramic ring by the previously above-described hermetic mechanical seal in Example I. The positive electrode was in contact with the exterior surface of the inner casing and the interior surface of the cathode casing. A similar retaining ring and open edge C sealing ring were provided between the flange of the first outer casing portion and the ceramic ring. A portion of the inner casing adjacent the ceramic ring was not provided with positive electrode material to provide a void volume. The lower retaining collar was positioned around the opposite surface of the flange of the cathode casing portion. The threaded fasteners were reinserted and were tightened to a pressure of about 300 lbs. to provide a complete hermetic mechanical seal. As it was discussed above, electrical insulation was provided between the respective flanges and retaining collars, and between the respective area of the outer casing portions and the retaining collars to prevent electrical short-circuiting of the cell. The resulting structure was a hermetically sealed sodium-sulfur cell made in accordance with my invention.

EXAMPLE IV

At operating temperature, the hermetically sealed sodium-sulfur cell of Example III exhibited the following initial polarization behavior which is shown below in Table I.

TABLE I

| Current Density- ma/cm$^2$ | Cell Voltage- Volts |
|---|---|
| 50.0 | 1.72 |
| 25.0 | 1.90 |
| 12.5 | 1.99 |
| 0 | 2.08 |

Subsequently, the cell was disassembled and the inner surface of the cathode casing portion was examined. The inner surface did not show signs of corrosion.

While other modifications of the invention and variations thereof which may be employed within the scope of the invention have not been described, the invention as intended to include such as may be embraced within the following claims.

What I claim as new and desire to secure by Letters Patent of the United States is

1. A cell casing portion comprising a container selected from the class consisting of aluminum, steel, and iron-nickel-cobalt alloys, a corrosion resistant and electronically conducting layer adhering to the inner surface of the container, and the layer selected from the class consisting of molybdenum and graphite.

2. A cell casing comprising an anode casing portion, a cathode casing portion, the anode casing portion comprising a container selected from the class consisting of aluminum, steel, and iron-nickel-cobalt alloys, the cathode casing portion comprising a container of the same metal as the anode container, a corrosion resistant and electronically conducting layer adhering to the inner surface of the container, and the layer selected from the class consisting of molybdenum and graphite.

3. A cell casing comprising a ceramic ring, an inner casing of a solid sodium ion-conductive material with one open end, a glass seal sealing a portion of the outer wall of the inner casing adjacent its open end within and to the ceramic ring, a metallic cathode casing portion with at least one open end and a flange at the open end, the cathode casing portion selected from the class consisting of aluminum, steel, and iron-nickel-cobalt alloys, a corrosion resistant and electronically conducting layer adhering to the inner surface of the cathode casing portion, the layer selected from the class consisting of molybdenum and graphite, the cathode casing portion surrounding the inner casing and spaced therefrom, the flange of the cathode casing portion adjacent the ceramic ring, a metallic anode casing portion with at least one open end and a flange at the open end positioned with the flange adjacent the ceramic ring whereby the anode casing portion is spaced from and extends in an opposite direction to the cathode casing portion, the anode casing portion selected from the same metal as the cathode casing portion, and means for joining the cathode and anode casing portions to the ceramic ring thereby forming a continuous outer cell casing.

4. A hermetically sealed sodium-sulfur cell comprising a ceramic ring, an inner casing of a solid sodium ion-conductive material with one open end, a glass seal sealing a portion of the outer wall of the inner casing adjacent its open end within and to the ceramic ring, a metallic cathode casing portion with an open and a closed end and a flange at the open end, the cathode casing portion selected from the class consisting of aluminum, steel, and iron-nickel-cobalt alloys, a corrosion resistant and electronically conducting layer adhering to the inner surface of the cathode casing portion, the layer selected from the class consisting of molybdenum and graphite, the cathode casing portion surrounding the inner casing and spaced therefrom, the flange of the cathode casing portion adjacent the ceramic ring, a metallic anode casing portion with an open and a closed end and a flange at the open end positioned with the flange adjacent the ceramic ring whereby the anode casing portion is spaced from and extends in an opposite direction to the cathode casing portion, the anode casing portion selected from the same metal as the cathode casing portion, and means for joining the cathode and anode portions to the ceramic ring thereby forming a continuous outer cell casing, a sodium negative electrode in the inner casing and in the anode casing portion, and a positive electrode in the cathode casing portion surrounding the inner casing and contacting the outer wall of the inner casing and the inner wall of the cathode casing portion, the positive electrode comprising sulfur in electrically conductive material.

* * * * *